United States Patent
Mozo Velasco et al.

(10) Patent No.: US 12,197,538 B2
(45) Date of Patent: Jan. 14, 2025

(54) METHOD FOR MODELLING SYNTHETIC DATA IN GENERATIVE ADVERSARIAL NETWORKS

(71) Applicant: Telefónica, S.A, Madrid (ES)

(72) Inventors: Alberto Mozo Velasco, Madrid (ES); Sandra Gómez Canaval, Madrid (ES); Antonio Pastor Perales, Madrid (ES); Diego R. Lopez, Madrid (ES); Edgar Talavera Muñoz, Madrid (ES); Ángel González Prieto, Madrid (ES)

(73) Assignee: Telefónica, S.A, Madrid (ES)

(*) Notice: Subject to any disclaimer, the term of this patent is extended or adjusted under 35 U.S.C. 154(b) by 451 days.

(21) Appl. No.: 17/586,863

(22) Filed: Jan. 28, 2022

(65) Prior Publication Data

US 2022/0237412 A1    Jul. 28, 2022

(30) Foreign Application Priority Data

Jan. 28, 2021   (EP) .................................. 21382064

(51) Int. Cl.
*G06N 3/045* (2023.01)
*G06F 18/214* (2023.01)

(52) U.S. Cl.
CPC ......... *G06F 18/2148* (2023.01); *G06N 3/045* (2023.01); *G06F 2218/10* (2023.01)

(58) Field of Classification Search
CPC ............................. G06N 3/0475; G06N 3/048
See application file for complete search history.

(56) References Cited

U.S. PATENT DOCUMENTS 11,983,853 B1 * 5/2024 Zhu .......................... G06T 5/70
2019/0012581 A1 * 1/2019 Honkala ............... G06V 10/758

OTHER PUBLICATIONS

European Search Report and the European Search Opinion Dated Jul. 11, 2021 From the European Patent Office Re. Application No. 21382064.0. (3 Pages).

(Continued)

*Primary Examiner* — Benjamin O Dulaney (57) ABSTRACT

A method for modelling a shape of data in a GAN comprising a generator agent (G) for generating synthetic data (110, 220) and a discriminator agent (D) for distinguishing between the generated synthetic data (120, 220) and real original data (110) that follow an arbitrary, continuous or discrete, distribution defined by a n-dimensional vector of input variables $x_i$. The method, before generating output synthetic data (220), computes an Inverse Smirnov transformation $f_{S_i}^{-1}$ for each of the n input variables $x_i$ and attaches an activation function (200) to the generator agent (G), wherein the activation function (200) is a n-dimensional vector $f_a^G$ formed by the computed Inverse Smirnov transformations, $f_a^G = (f_{S_1}^{-1}, f_{S_2}^{-1}, \ldots, f_{S_n}^{-1})$. The GAN implementing the method generates the output synthetic data (220) using the activation function (200) which outputs synthetic data (220) with a distribution (420, 420') whose shape is the same as the arbitraty distribution of the original data (110).

8 Claims, 5 Drawing Sheets (56) References Cited

OTHER PUBLICATIONS

Chen et al. "Statistical Guarantees of Generative Adversarial Networks for Distribution Estimation", ArXiv Preprint ArXiv:2002.03938v2, p. 1-24, Jul. 16, 2020.
Chou et al. "Deep-Learning-Based Defective Bean Inspection With GAN-Structured Automated Labeled Data Augmentation in Coffee Industry", Applied Sciences, 9(19): 4166-1-4166-26, Oct. 4, 2019.
Diesendruck et al. "Importance Weighted Generative Networks", ArXiv Preprint ArXiv:1806.02512v3, p. 1-25, Sep. 6, 2020.
Garcia Torres "Generation of Synthetic Data With Generative Adversarial Networks", Master Degree, XP055820142, TU/E Eindhoven University of Technology, Degree Project in Information and Communication Technology, Stockholm Sweden, KTH Royal Institute of Technology School of electrical Engineering and Computer Science, p. 1-82, Nov. 26, 2018.
Hjelm et al. "Boundary-Seeking Generative Adversarial Networks", ArXiv Preprint ArXiv:1702.08431v4, p. 1-17, Feb. 21, 2018.
Jang et al. "Categorical Reparameterization With Gumbel-Softmax", ArXiv Preprint ArXiv:1611.01144v5, p. 1-13, Aug. 5, 2017.
Kusner et al. "GANS for Sequences of Discrete Elements With the Gumbel-Softmax Distribution", ArXiv Preprint ArXiv:1611.04051v1, p. 1-6, Nov. 12, 2016.
Naeini "Structure Guided Image Restoration—A Deep Learning Approach", A Thesis Submitted in Partial Fulfillment of the Requirements for the Degree of Master of Science in The Faculty of Science, Modelling and Computational Science, University of Ontario, Canada, XP055820155, p. 1-175, May 2019.
Song et al. "Binary Generative Adversarial Networks for Image Retrieval", Proceedings of the 32nd AAAI Conference on Artificial Intelligence, AAAI-18, 32(1): 394-401, Apr. 25, 2018.
Tagasovska et al. "Copulas as High-Dimensional Generative Models: Vine Copula Autoencoders", ArXiv Preprint ArXiv:1906.05423v1, XP081376715, p. 1-17, Jun. 12, 2019.

\* cited by examiner

METHOD FOR MODELLING SYNTHETIC DATA IN GENERATIVE ADVERSARIAL NETWORKS

RELATED APPLICATION

This application claims the benefit of priority of Europe Patent Application No. 21382064.0 filed on Jan. 28, 2021, the contents of which are incorporated herein by reference in their entirety.

FIELD AND BACKGROUND OF THE INVENTION

The present invention has its application within the telecommunication networks, more specifically, relates to the Generative Adversarial Networks (GANs)

More particularly, the present invention refers to a method for modelling and shaping data produced by a GAN to fit a required distribution.

Generative Adversarial-Neural-Networks (GANs) refer to a neural network architecture capable of producing synthetic data with similar statistical properties as the real one and with high resolution. A GAN is a Deep Learning model able to learn data distributions through twofold training using an adversarial learning method. This model can generate very sharp data, even for data such as images with complex, highly multimodal distributions. In this context, GAN networks have gained special attention owing to their high image reproduction ability for generating samples of natural images.

The adversarial learning method uses two neural networks: generative and discriminate. Roughly speaking, the generative network (G) implicitly learns the data distribution and acts as a sampler to generate new synthetic instances mimicking the data distribution. In particular, G needs to be flexible enough to approximately transform white noise into the real data distribution. On the other hand, the discriminative network (D) is powerful enough to learn to distinguish the generated distribution from the real data distribution.

In many standard use cases, like those arising in image processing, not too many problems arise using GANs. However, this is not always the case in other types of scenarios. GAN model has limitations when aiming to generate sequences of discrete elements or, in general, to match with a specific data distribution. In the case of discrete features, the problem relies on the fact that the associated mass/density function is not differentiable, so it is not suitable for optimizing the backwards weights of the generator network. In the case of continuous distributions, specific activation functions must be handcrafted for each possible real distribution.

In other words, GANs are trained by propagating gradients back from the discriminator D through the generated samples to the generator G. But, when data include discrete features or data themselves are a sequence of discrete items, the backpropagated gradients vanish, so gradient descent update via back-propagation cannot directly be applied for a discrete output. Analogously, in the case of continuous data, some extra restrictions on the distribution of the real data may arise (e.g. non-negative values) and the chosen activation function fully determines a concrete output data distribution. For this reason, a generic method for bending the output distribution with the real data to be mimic is required. It is worthy to mention that this problem is not observed for GANs applied to image processing, since pixel intensity distribution tends to be normal-like, so they are correctly generated with a simple linear activation, and human eye capability is not able to perceive the minor differences between real and fake pixels.

Specifically, traditional GANs produce data at their output that tend to distribute as a normal distribution. If a given scenario does not fulfil with this type of restrictions, non-suitable values will be obtained, like negative values for counters and accumulators (e.g. duration of a TCP flow, round-trip time or RTT, number of packets or bytes). In addition, if only finitely many real values (e.g. a discrete set of values) can be attained, the usual GAN architecture will only be able to replicate them as a continuous of values. In other words, it means that the shape of the generated data may not be coincident with the original data when these data do not follow a normal distribution. In particular, if a non-appropriate activation function is applied, then the obtained output data may not fulfil the domain restrictions of the real data (e.g. to get negative values when only positive ones can be obtained like in the duration of a TCP flow, rtt, number of packets or bytes). Furthermore, if real values follow a discrete set (e.g. size of a TCP window, Time To Live or TTL), a traditional GAN is going to generate real values following a normal distribution (i.e. a non-discrete set of values).

There are some approaches disclosed in articles found in the literature which address the aforementioned problem by training generators with discrete outputs. All the existing solutions in prior art deal with this problem by defining several ad hoc models to directly estimate or fit the data distribution by means of a gradient policy, namely:

- "GANS for Sequences of Discrete Elements with the Gumbel-softmax Distribution" by M. Kusner, J. Hernandez-Lobato (arXiv, 2016): This article propose uses a Gumbel-softmax output distribution in generating tasks in order to generating sequences of discrete elements, which is a continuous approximation to a multinomial distribution parameterized in terms of the softmax function. It allows that the resulting sampling process is differentiable. These results, which are proposed from a theoretical perspective and as a proof of concept, are only focused to generate specific discrete sequence data.
- "Categorical Reparameterization with Gumbel-Softmax" by Jang, E. et al. (arxiv:1611.01144, 2016) and "Boundary-Seeking Generative Adversarial Networks" by Devon, A. et al. (arXiv: 1702.0843, 2018): These articles provide a policy gradient for training the generator based on a gradient estimator using Gumbel-Softmax, a continuous distribution on the simplex that can approximate categorical samples, and whose parameter gradients can be easily computed via the reparameterization trick. It implies the modification of the implicit estimation model.
- "Binary generative adversarial networks for image retrieval" by J. Song, T. He, et al. (AAAI Conference on Artificial Intelligence, pp. 394-401, 2018): This paper utilizes a reinforce algorithm as a policy gradient algorithm. The generator which generates fake data maximizing the discriminator's output can be thought of as a policy agent in reinforce learning, which is a probability distribution to take action maximizing a reward in a given state.
- "Importance Weighted Generative Networks" by Elenberg, E. et al. (Joint European Conference on Machine Learning and Knowledge Discovery in Databases ECML PKDD 2019: Machine Learning and Knowledge Discovery in Databases. pp 249-265, 2020): This paper modifies the GAN structure, specifically the standard estimator, by rescaling the observed data distribution during training, or equivalently by reweighting the contribution of each data point to the loss function.

"Statistical Guarantees of Generative Adversarial Networks for Distribution Estimation" by Chen M. et al. (arXiv:2002.03938, 2020): This paper introduces a theoretical study that provides statistical guarantees of GANs for the estimation of data distributions which have densities in a Holder space. Particularly, generator and discriminator networks utilize general weight matrices and the non-invertible Rectified Linear Unit (ReLU) activation function.

Recently, some works addressing GAN models for generating structured data on continuous distributions have been proposed (e.g. "GAN-based semi-supervised for imbalanced data classification" by Zhou, T. et al., 2018 4th International Conference on Information Management (ICIM), Oxford, pp. 17-21, 2018; "Deep-Learning-Based Defective Bean Inspection with GAN-Structured Automated Labeled Data Augmentation in Coffee Industry" by Chou, Y.-C.; Appl. Sci. 2019, Vol. 9, Issue No. 19, Article No. 4166, 2019), but in general these solutions only propose ad-hoc mechanisms for replicating a concrete data distribution and do not address the problem in a general way for any continuous or discrete data distribution.

Summarizing, none of the existing solutions solves the aforementioned problem due to:
They require a very ad hoc and handcrafted approach to produce the appropriate activation function that mimics the real data distribution whereas it is discrete or continuous.
They require modification of the GAN internals.
They are not able to preserve the restrictions of the original data domain.

Therefore, there is a need in the state of the art for providing a GAN with an activation function which is capable of dealing with real data that follow any arbitrary distribution.

SUMMARY OF THE INVENTION

The present invention solves the aforementioned problems and overcomes previously explained state-of-art work limitations by providing a method to be attached, at the last stage, to a neural network architecture of GANs to fit the underlying distribution of the real data to be generated. This whole process is obtained by means of post-composing the standard generator output with a statistical transformation called the Inverse Smirnov transform.

The GAN (Generative Adversarial Network) comprises i) a generator agent or network configured to generate synthetic data and ii) a discriminator agent or network configured to distinguish between the generated synthetic data and real original data, the original data following any arbitrary, distribution which can be defined by a n-dimensional vector of input variables $(x_i)$.

An aspect of the present invention refers to a method for modelling data produced by a GAN which, before generating by the generator agent its output synthetic data, computes an Inverse Smirnov transformation for each of the n input variables $x_i$ and wherein an activation function which is a n-dimensional vector formed by the n computed Inverse Smirnov transformations is attached to the generator agent to generate the output synthetic data. By using the activation function based on Inverse Smirnov transformations, the distribution of the generated synthetic data output by the GAN has the same shape (continuous or discrete) as the arbitrary distribution of the original data.

The method in accordance with the above described aspects of the invention has a number of advantages with respect to the aforementioned prior art, which can be summarized as follows:

The present invention improves the resolution of GANs at least at two issues: i) if real data follows a certain distribution (e.g. discrete or continuous but not normal), the proposed GAN architecture is going to generate synthetic values following the same distribution; ii) if the invention is applied to an existing GAN, the Smirnov inverse transformation at the end of generator allows the preservation of domain restrictions of the data (e.g. generate non-negative values for counters or accumulators).

The present invention can work as a fast add-on in a GAN. Once pre-computed, the Inverse Smirnov transform can be interpolated using standard interpolation techniques to operate efficiently in real-time.

These and other advantages will be apparent in the light of the detailed description of the invention.

BRIEF DESCRIPTION OF THE SEVERAL VIEWS OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

DESCRIPTION OF SPECIFIC EMBODIMENTS OF THE INVENTION

The embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
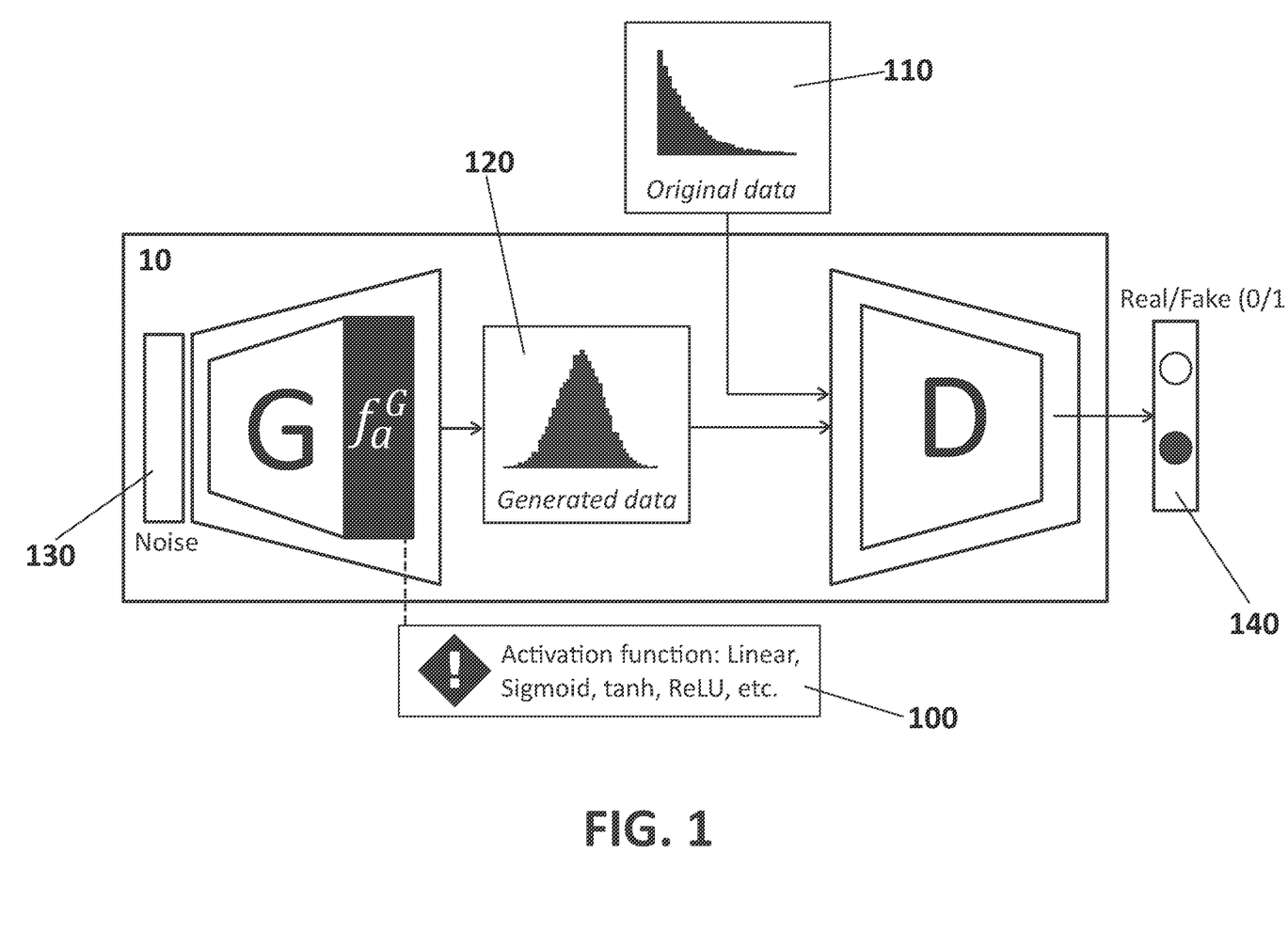
FIG. 1 shows a block diagram of a GAN architecture as known in the state of the art previous to the invention.

The current state-of-art of GAN technologies can be summarized in FIG. 1. An existing given GAN (10) comprises two main components (G, D):

A generative network or generator agent (G) which generates synthetic data (120) by transforming white noise (130) into a real data distribution through a standard activation function (100), such as a linear function, rectified linear activation function ReLU, tanh, sigmoid, etc., the activation function being denoted as $f_a^G$.

As in the existing given GAN (10) of FIG. 1, $f_a^G$ is a standard activation function (100), the output of the generator agent (G) tends to be a normal distribution. It is worth noting that the original data (110) to be mimicked may not follow this normal shape, e.g. in the example illustrated in FIG. 1, the original data (110) distribution is Poisson-like. Therefore, the shape of the generated data (120) produced by the conventional existing GAN (10) is not coincident with the original data (110) as shown in FIG. 1. The role of the generator agent (G) is to improve the quality of the generated data (120) to replicate the original distribution of the original data (110).

A discriminative network or discriminator agent (D) whose role is to distinguish between original data (110) and generated data (120). The output (140) delivered by the discriminator agent (D) may be a value selected from 0 and 1 which indicates if the produced data are either real or fake.

Figure 2:
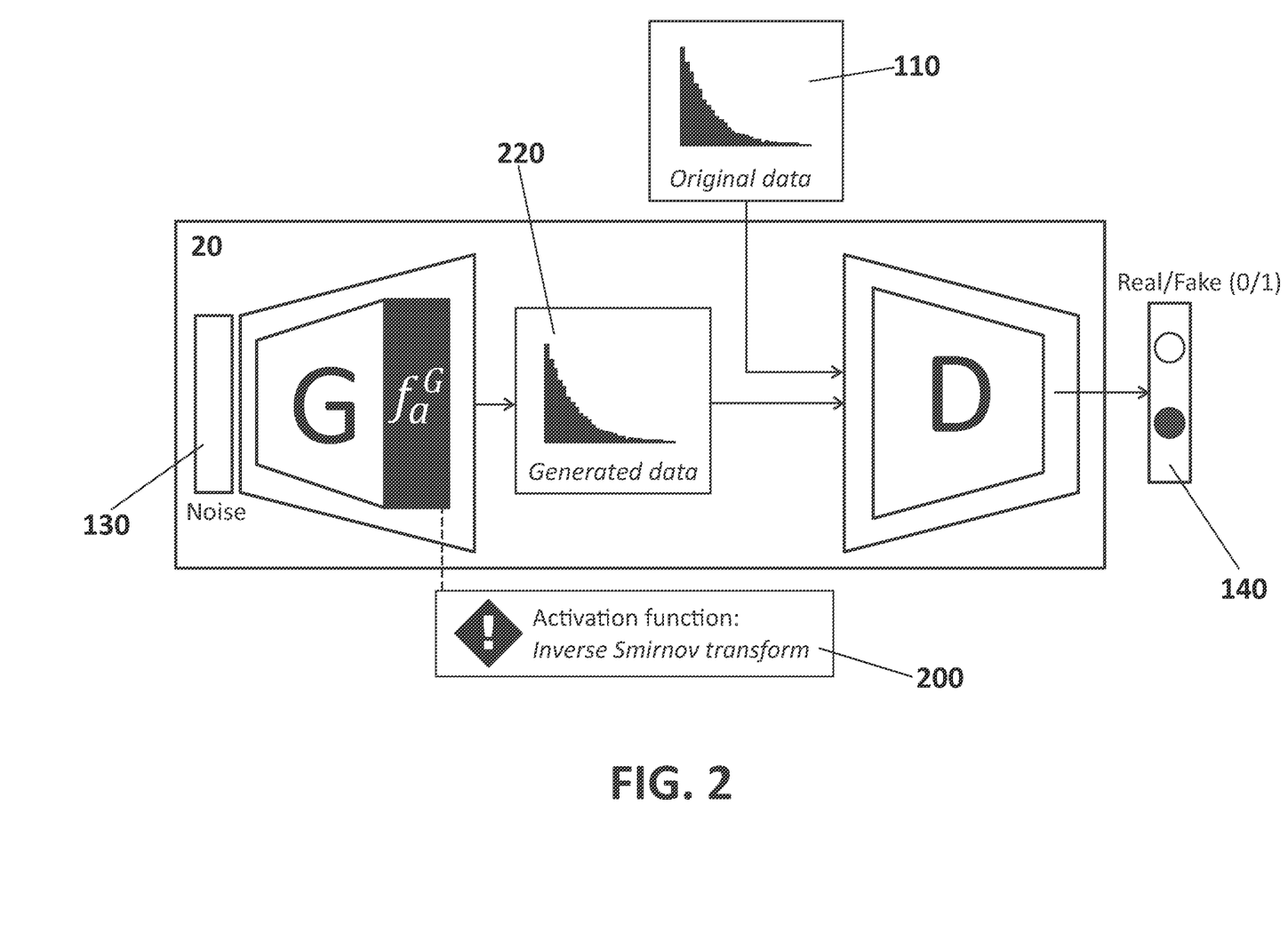
FIG. 2 shows a block diagram of a GAN architecture, according to a preferred embodiment of the invention.

FIG. 2 shows an embodiment of the invention, providing a GAN (20) with an activation function (200), $f_a^G$, which is not any standard activation function (100) but $f_a^G$ is an Inverse Smirnov transform. The GAN (20) can deal with real original data (110) following any arbitrary distribution, continuous or discrete. Its generative agent (G) and discriminative agent (D) may be implemented by neural networks, for instance, but, in general, the main components (G, D) can be implemented in a general scheme.

Figure 3:
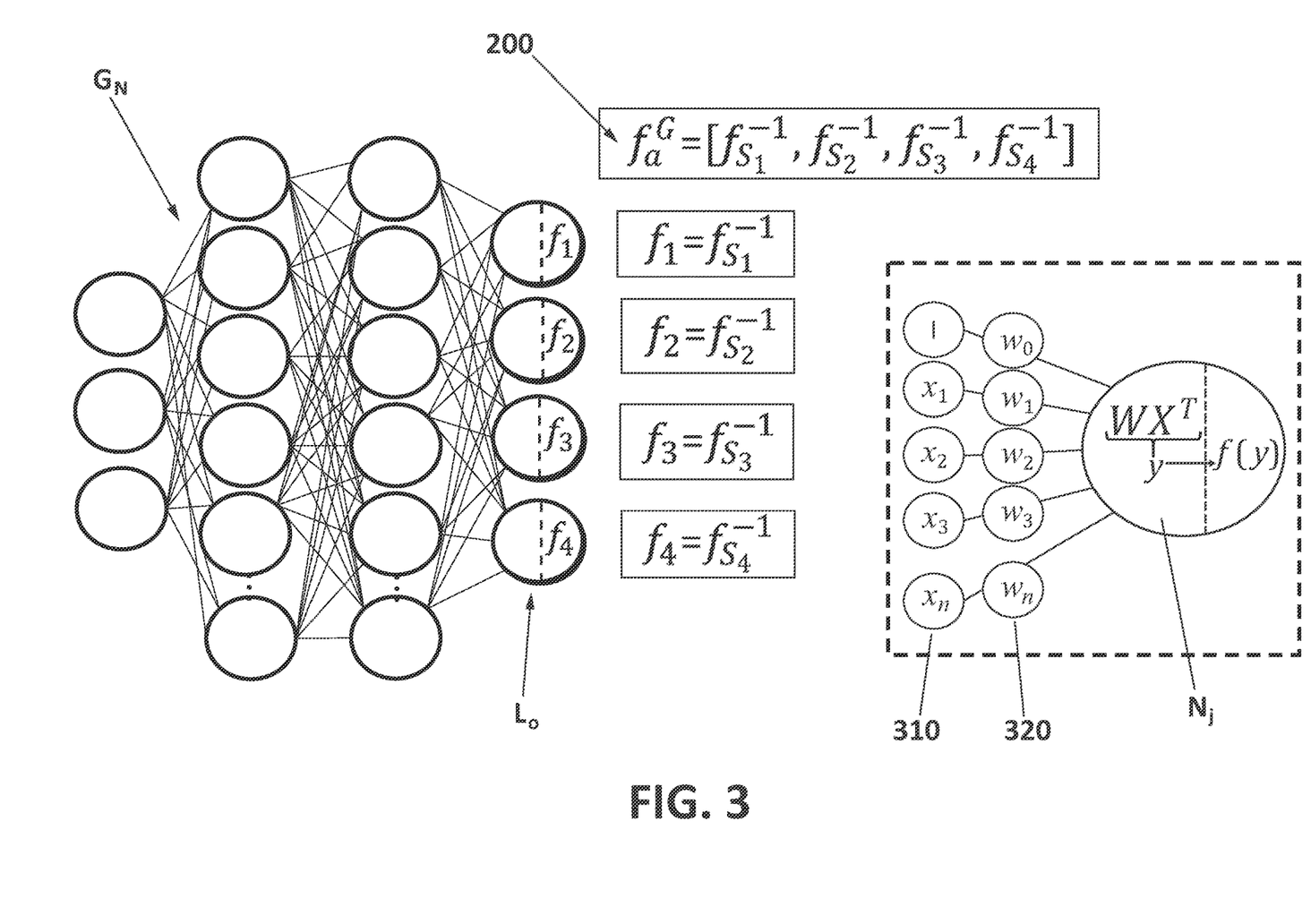
FIG. 3 shows a schematic diagram of a generative neural network implementing an activation function via Smirnov transform, according to a possible embodiment of the invention.

Regardless of the architecture adopted for the generating neural network or GAN (20), a preliminary step for modelling the synthetic data, Step 0, is to compute the Inverse Smirnov transform to be used as the activation function (200) for the output layer ($L_o$) of the neural network ($G_N$) implementing the generative network (G). This Inverse Smirnov transformation is computed for each of the features of the input dataset or input variables $x_i$, column (310) input to each neuron ($N_j$) whose internal detail are shown in FIG. 3.

As explained before, in the state-of-art of GANs, the activations functions of the neurons are selected from sigmoidal, linear or rectified linear functions. By contrast, the neural network ($G_N$) illustrated in FIG. 3, according to a possible embodiment of the invention, uses the Inverse Smirnov Transforms of each feature to be fitted as activation functions. The parameters $f_1, f_2, f_3, f_4$ stand for the activation functions of the neurons of the output layer ($L_o$) of the neural network ($G_N$). FIG. 3 shows at the output layer ($L_o$) a plot indicating $f_i = f_{S_i}^{-1}$, i=1, 2, ..., as the proposed solution is to take as activations the Inverse Smirnov Transforms. Also, regarding the example illustrated in FIG. 3, another column (320) of parameters $w_1, \ldots, w_n$ which are the so-called weights of the neural network ($G_N$) can be applied in each neuron ($N_j$). Neural networks are deep learning models designed to fit any desired output. For this purpose, the model contains a collection of parameters, in this case the weights $w_1, \ldots, w_n$, which are tuned during a process usually referred to as the training of the neural network.

For simplicity of calculation of the Inverse Smirnov transformation for an input variable $x_i$ at Step 0, the output for generative network (G) is assumed to be one-dimensional $f_{S_i}^{-1}$. In general, the G output ($L_o$) is m-dimensional and therefore, $f_a^G$ are m-dimensional vectors of functions forming the activation function (200). Therefore, for each of the features ($x_i$) of the input dataset, Step 0 computes the Inverse Smirnov transform $f_{S_i}^{-1}$ to be applied as activation function (200) in later steps performed by the generative network (G).

Step 0: for $x_i$, i=1 ... n
obtain $f_{S_i}^{-1}$

Here $f_{S_i}$ is the Smirnov transform and $f_{S_i}^{-1}$ is its inverse function, computed as follows: Explicitly, let $F_{Norm}$ be the cumulative distribution function of a standard normal distribution, and let $F_{Data}$ be the cumulative distribution of the original sample (x) which may be estimated through an histogram of the input data. The Inverse Smirnov transform, $f_{S_i}^{-1}$, is given by:

$$f_{S_i}^{-1}(x) = F_{Data}^{-}(F_{Norm}(x))$$

With this computation of $f_{S_i^{-1}}$ the activation function (200) post-composes the distribution generation of a generative agent (G), e.g. of a generating neural network, with the statistical transformation of the Inverse Smirnov transform.

At this point, these Inverse Smirnov transformations are gathered into a function $f_a^G = (f_{S_1}^{-1}, f_{S_2}^{-1}, \ldots, f_{S_n}^{-1})$. This $f_a^G$ is a new activation function (200) to be attached at the end of the generator agent (G), as shown in FIG. 2, so that the shape of the generated data (220) can agree with the original data (110).

Observe that no new training method is needed, and the system can be trained as usual, e.g., backpropagation in the case that the GAN is implemented through neural networks, but with the new activation function (200), $f_a^G$, attached at the end of the generator (G).

In the case that neural networks are used for implementing GANs, the detailed attachment of the activation function (200) being a n-dimensional vector of Inverse Smirnov transformations to the GAN architecture distribution is shown in FIG. 3. At each of the output neurons ($N_i$) at the last layer or output layer ($L_o$) of the generator network (G), the corresponding n activation functions are substituted by the Inverse Smirnov transforms obtained at Step 0, $f_a^G = (f_{S_1}^{-1}, f_{S_2}^{-1}, \ldots, f_{S_n}^{-1})$.

Figure 4:
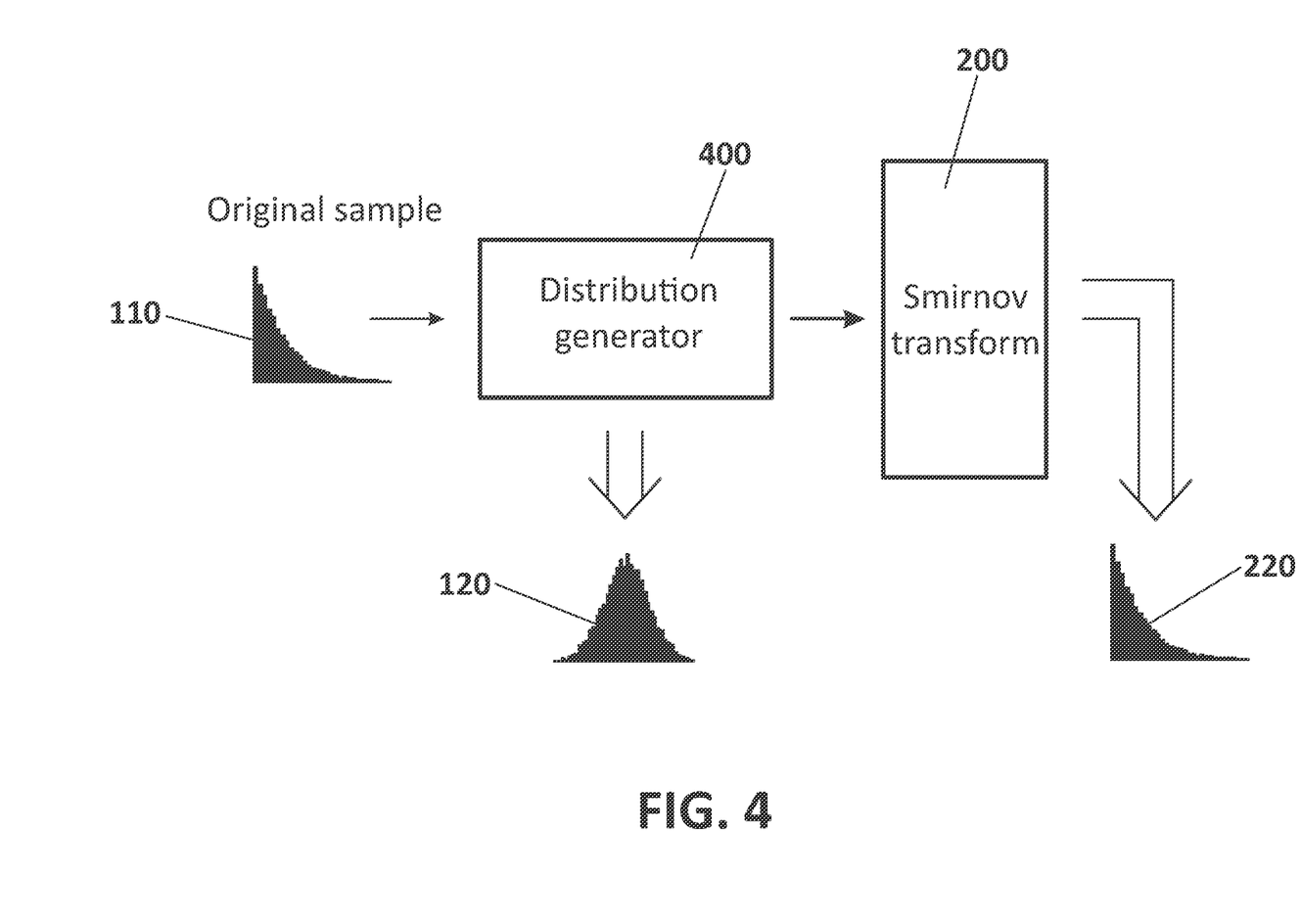
FIG. 4 shows a graphic comparing the performance of the method for adaptive scheduling of edge tasks to static scheduling policies known in the state of the art, running on an edge-based network topology.

FIG. 4 shows a summary of the operation of the proposed method for modelling a shape of data using a distribution generator (400) which is a generative agent (G) of a given GAN (10) that is standard, existing in the prior-art as the GAN (10) shown in FIG. 1, but the method can be applied to any generative technique.

Figure 5:
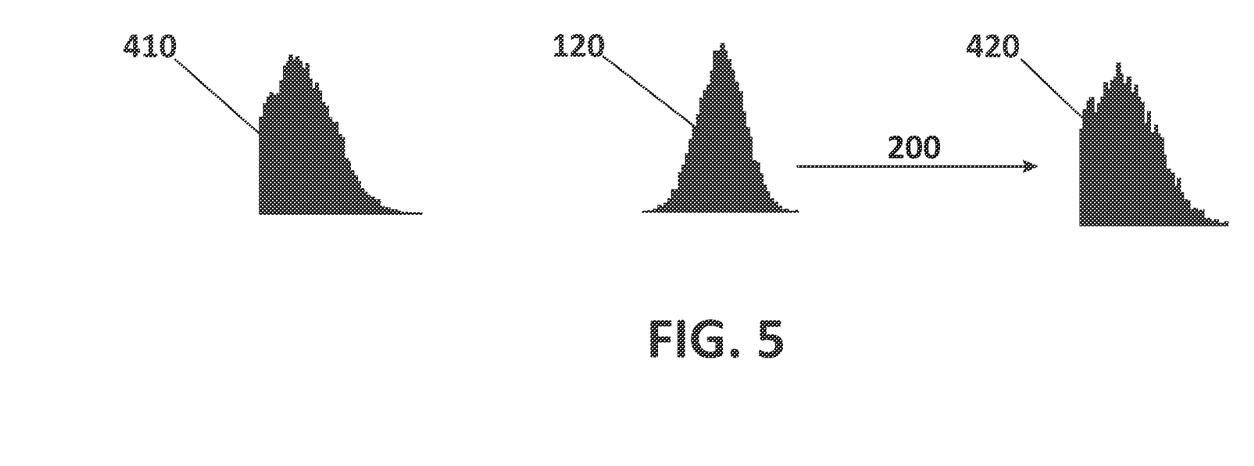
FIG. 5 shows the distributions of the original data, the synthetic data generated with a standard activation function and the synthetic data generated with the activation function of the invention, in case that the original data follows a continuous distribution.
Figure 6:
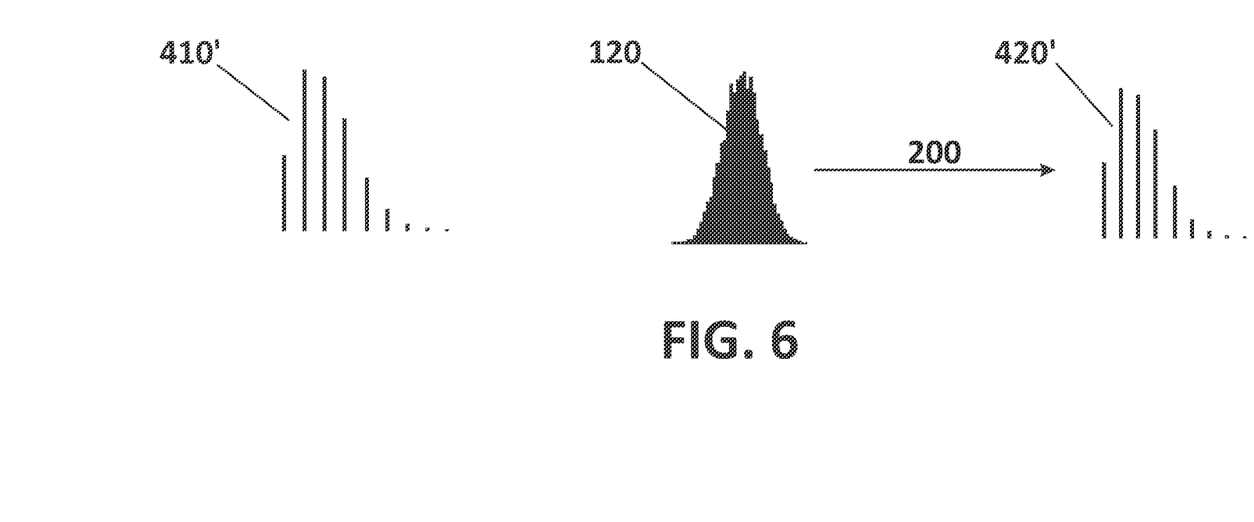
FIG. 6 shows the distributions of the original data, the synthetic data generated with a standard activation function and the synthetic data generated with the activation function of the invention, in case that the original data follows a discrete distribution.

To emphasize the advantages of the invention, FIGS. 5 and 6 present graphically the operation mode for some restrictions of the domain of the original data (110). For instance:

In FIG. 5, the original data (110) follows a continuous distribution (410). If a feature of the original data (110) is non-negative, i.e. a counter or a rate, the generated distribution (120) for this feature using standard GANs may attain negative values, but the output synthetic data (220) generated or transformed using the proposed activation function (200) presents a continuous distribution (420) that respects this restriction leading to non-negative values.

In FIG. 6: the original data (110) follows a discrete distribution (410'). The generated distribution (120)

with standard GANs is continuous as in FIG. 5. However, the output synthetic data (220) generated using the proposed activation function (200) leads to an output with a discrete distribution (420') and respects the discretely distributed features, i.e. counters or categories, of the original data (110). It is worthy to mention that this problem is a hot topic in the frontier of the current knowledge.

Therefore, the generated synthetic data (220) output by the GAN using the activation function (200) has a distribution (420, 420') whose shape is the same as the arbitraty distribution of the original data (110).

Note that in this text, the term "comprises" and its derivations (such as "comprising", etc.) should not be understood in an excluding sense, that is, these terms should not be interpreted as excluding the possibility that what is described and defined may include further elements, steps, etc.

What is claimed is:

1. A method for modelling a shape of data in a Generative Adversarial Network, GAN, comprising a generator agent (G) configured to generate synthetic data and a discriminator agent (D) configured to distinguish between the synthetic data generated by the generator agent (G) and real original data following an arbitrary, continuous or discrete, distribution which is defined by a n-dimensional vector of input variables $x_i$; wherein the method, before generating output synthetic data, computes an Inverse Smirnov transformation $f_{S_i}^{-1}$ for each of the n input variables $x_i$ and an activation function, wherein the activation function is a n-dimensional vector $f_a^G$ formed by the computed Inverse Smirnov transformations, $f_a^G = (f_{S_1}^{-1}, f_{S_2}^{-1}, \ldots, f_{S_n}^{-1})$, and generates the output synthetic data using the activation function attached to the generator agent (G).

2. The method according to claim 1, wherein the activation function substitutes a standard activation function of an existing given GAN.

3. The method according to claim 2, wherein the generator agent (G) and the discriminator agent (D) are implemented by neural networks.

4. The method according to claim 2, wherein the Inverse Smirnov transformation $f_{S_i}^{-1}$ is computed as $f_{S_i}^{-1}(x) = F_{Data}^{-1}(F_{Norm}(x))$, wherein $F_{Norm}$ is the cumulative distribution function of a standard normal distribution and $F_{Data}$ is the cumulative distribution of an original sample x from the n-dimensional vector of input variables $x_i$.

5. The method according to claim 1, wherein the generator agent (G) and the discriminator agent (D) are implemented by neural networks.

6. The method according to claim 5, wherein the Inverse Smirnov transformation $f_{S_i}^{-1}$ is computed as $f_{S_i}^{-1}(x) = F_{Data}^{-1}(F_{Norm}(x))$, wherein $F_{Norm}$ is the cumulative distribution function of a standard normal distribution and $F_{Data}$ is the cumulative distribution of an original sample x from the n-dimensional vector of input variables $x_i$.

7. The method according to claim 1, wherein the Inverse Smirnov transformation $f_{S_i}^{-1}$ is computed as $f_{S_i}^{-1}(x) = F_{Data}(F_{Norm}(x))$, wherein $F_{Norm}$ is the cumulative distribution function of a standard normal distribution and $F_{Data}$ is the cumulative distribution of an original sample x from the n-dimensional vector of input variables $x_i$.

8. The method according to claim 7, wherein the activation function is performed by each neuron of an output layer ($L_o$) of the generator network (G).

* * * * *